United States Patent
Prothero (10) Patent No.: US 10,250,429 B2
(45) Date of Patent: *Apr. 2, 2019

(54) SPECTRALLY-EFFICIENT SPIRAL-BASED WAVEFORMS FOR COMMUNICATION

(71) Applicant: Astrapi Corporation, Dallas, TX (US)

(72) Inventor: Jerrold Prothero, Washington, DC (US)

(73) Assignee: Astrapi Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,487

(22) Filed: Jan. 12, 2018

(65) Prior Publication Data
US 2018/0205592 A1    Jul. 19, 2018

Related U.S. Application Data

(63) Continuation of application No. 15/142,276, filed on Apr. 29, 2016, now Pat. No. 9,906,395.

(60) Provisional application No. 62/155,856, filed on May 1, 2015.

(51) Int. Cl.
*H04L 27/00* (2006.01)
*H04L 27/34* (2006.01)
*H04L 27/36* (2006.01)

(52) U.S. Cl.
CPC ...... *H04L 27/3411* (2013.01); *H04L 27/3494* (2013.01); *H04L 27/363* (2013.01); *H04L 27/0004* (2013.01)

(58) Field of Classification Search
CPC .............. H04L 27/0004; H04L 27/3494; H04L 27/363
See application file for complete search history.

(56) References Cited

U.S. PATENT DOCUMENTS

| | | | |
|---|---|---|---|
| 8,472,534 B2 | 6/2013 | Prothero | |
| 8,861,327 B2 | 10/2014 | Prothero et al. | |
| 2008/0133982 A1* | 6/2008 | Rawlins | H03F 1/0211 |
| | | | 714/699 |
| 2008/0172433 A1 | 7/2008 | Lee | |
| 2011/0222584 A1 | 9/2011 | Michaels | |
| 2012/0263031 A1* | 10/2012 | Prothero | H04L 27/0004 |
| | | | 370/204 |
| 2013/0251018 A1 | 9/2013 | Prothero | |
| 2014/0254698 A1 | 9/2014 | Jones et al. | |

(Continued)

OTHER PUBLICATIONS

M. Yeary et al., "Waveform synthesis via splines", Instrumentation and Measurement Technology Conference, 2003. IMTC '03. Proceedings of the 20th IEEE, 2003.*

(Continued)

*Primary Examiner* — Ross Varndell
(74) *Attorney, Agent, or Firm* — Maier & Maier, PLLC (57) ABSTRACT

Methods for communicating are disclosed. A method includes obtaining at least one input communication symbol selected from a set of communication symbols, converting the at least one input communication symbol into at least one transmittable waveform using at least one defined spiral waveform function, and transmitting the at least one transmittable waveform over a communication channel. Example spiral waveform functions include spline-based piecewise functions and Archimedes spiral functions.

8 Claims, 3 Drawing Sheets

(56) References Cited

U.S. PATENT DOCUMENTS

2014/0266428 A1    9/2014  Chiron et al.

OTHER PUBLICATIONS

International Search Report and the Written Opinion of the International Searching Authority dated Jul. 26, 2016, in connection with corresponding International Application No. PCT/US2016/030078;11 pgs.

I. Kvecher, et al., "An Analog Modulation Using a Spiral Mapping", 2006 IEEE 24th Convention of Electrical and Electronics Engineers in Israel, p. 194-198; 5 pgs.

* cited by examiner

SPECTRALLY-EFFICIENT SPIRAL-BASED WAVEFORMS FOR COMMUNICATION

CROSS-REFERENCE TO RELATED APPLICATIONS

This application claims priority from U.S. patent application Ser. No. 15/142,276, filed on Apr. 29, 2016, entitled "Spectrally-efficient spiral-based waveforms for communication," which in turn claims priority from U.S. Provisional Patent Application No. 62/155,856, filed on May 1, 2015, entitled "Spectrally-efficient spiral-based waveforms for communication," the entire contents of which are hereby incorporated by reference.

BACKGROUND

Applicant's prior U.S. Pat. No. 8,472,534 entitled "Telecommunication Signaling Using Non-Linear Functions" and U.S. Pat. No. 8,861,327 entitled "Methods and Systems for Communicating", the contents of which are herein incorporated by reference in their entirety, introduced spiral-based signal modulation. Spiral-based signal modulation may base signal modulation on complex spirals, rather than the traditional complex circles used by standard signal modulation techniques such as Quadrature Amplitude Modulation (QAM) and Phase-Shift Keying (PSK).

In spiral modulation, symbol waveforms may be constructed by multiplying a complex circle, whose period may correspond to the symbol time, by a sequence of real amplitude values that may vary over the symbol time. To avoid boundary amplitude discontinuities, these amplitude values may first increase then decrease over the symbol time, returning to the initial amplitude. Symbol waveforms may be distinguished from each other by this amplitude variation, a technique that may be called "intra-symbol amplitude modulation". Standard modulation techniques, such as phase modulation, may be additionally applied.

Intra-symbol amplitude modulation provides new ways to distinguish between symbol waveforms, and therefore to potentially improve communication performance. However, certain inefficiencies may still be present in existing intra-symbol amplitude modulation-based communication methods, and further refinements to intra-symbol amplitude modulation-based communication technology may still be made.

SUMMARY

Applicant's prior patents noted above disclosed an exemplary implementation of spiral modulation in which spiral-based symbol waveforms were formed through multiplying a complex circle by a rising exponential (the "head function") for part of the symbol time, optionally connected to a "tail function" that returned the amplitude to its original value. The intra-symbol amplitude variation was therefore defined, at least for the "head function" portion of the symbol time, by the properties of an exponential.

While exponentials have useful mathematical properties, they may not be optimal for minimizing spectrum usage. According to some exemplary embodiments, other exemplary techniques for forming spirals with more spectrally-efficient characteristics may be available, and a communication method making use of intra-symbol amplitude modulation may incorporate such techniques in order to minimize derivative discontinuities. Three such exemplary techniques may include two variations of splines, and the use of linear amplitude variation (generating an "Archimedes spiral"). However, other techniques for generating smooth amplitude variations that reduce spectrum usage compared to exponentials may also be used, as desired.

According to an exemplary embodiment, a method for communicating may include obtaining at least one input communication symbol selected from a set of communication symbols; converting the at least one input communication symbol into at least one transmittable waveform using at least one non-periodic function selected from a set of non-periodic functions; and transmitting the at least one transmittable waveform over a communication channel, wherein at least one non-periodic function selected from the set of non-periodic functions is a complex circle function multiplied by a piecewise function, the piecewise function comprising a plurality of cubic piecewise polynomials and having the form $$S(x) = \begin{cases} p_1(x) = a_1 + b_1 x + c_1 x^2 + d_1 x^3, x \in [x_0, x_1] \\ \vdots \\ p_n(x) = a_n + b_n x + c_n x^2 + d_n x^3, x \in [x_{n-1}, x_n] \end{cases}$$

wherein, for a cubic polynomial p defined over a particular interval, a, b, c, and d are constants defined for that cubic polynomial over the particular interval.

Another exemplary method for communicating may include obtaining at least one input communication symbol selected from a set of communication symbols; converting the at least one input communication symbol into at least one transmittable waveform using at least one non-periodic function selected from a set of non-periodic functions; and transmitting the at least one transmittable waveform over a communication channel, wherein at least one non-periodic function selected from the set of non-periodic functions comprises an Archimedes Spiral function having the form $$f(t) = (a + bt)e^{\frac{2\pi j}{C}t}$$

wherein a is a constant defining a starting amplitude, b is a slope, C is a constant defining the rate of angular progression of the spiral in complex space, and j is an imaginary square root of minus one.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of spiral modulation in which spiral-based symbol waveforms may be formed may be disclosed. Such waveforms may have utility in, for example, communication using the electromagnetic spectrum.

According to some exemplary embodiments, multiple potential implementations of spiral-based symbol waveforms, and multiple techniques for generating those implementations, may be disclosed. Certain of the implementations or techniques may have particular benefits when used for particular applications or when used in particular roles. For example, an exemplary embodiment of a method for communicating may use spiral-based symbol waveforms in order to optimize bandwidth usage; according to such an exemplary embodiment, specific spiral-based symbol waveforms may be chosen that optimize bandwidth usage and allow for better bandwidth control. According to another exemplary embodiment, an exemplary embodiment of a method for communicating may use spiral-based symbol waveforms in order to minimize coherent interference rejection or power usage, and specific spiral-based symbol waveforms may be chosen to optimize these qualities. Optimizations to other qualities may be made, as desired.

According to an exemplary embodiment disclosed in Applicant's above patents, spiral-based symbol waveforms may be implemented by multiplying a complex circle by a rising exponential (the "head function") for part of the symbol time; this may optionally be connected to a "tail function" that returns the amplitude to its original value. The intra-symbol amplitude variation of the spiral-based symbol waveform may therefore be defined, at least for the "head function" portion of the symbol time, by the properties of an exponential.

While exponentials have useful mathematical properties, they may not be optimal for minimizing spectrum usage. According to other exemplary embodiments, other exemplary techniques for forming spirals with more spectrally-efficient characteristics may also be available; for example, this may include techniques for generating smooth amplitude variations that reduce spectrum usage compared to exponentials, or other techniques, as desired.

According to an exemplary embodiment, techniques for generating smooth amplitude variations that reduce spectrum usage compared to exponentials may make use of spline interpolation. Though spline interpolation may be understood in the art, a brief overview of spline interpolation may be provided for purposes of clarity.

As understood in the art, spline interpolation may be a form of interpolation that makes use of an interpolant called a spline. The "spline" terminology may be derived from a type of elastic ruler that was used in shipbuilding; a number of predefined points ("knots") would be drawn on a grid, and the ruler (the spline) would be bent to pass through all of the points, thereby defining a curved line. Spline interpolation may make use of piecewise polynomials, defined by a number of sub-functions, and which pass through a number of predefined points; the resulting spline curves generally have a curved shape.

Spline interpolation may be understood as follows. We may start with a function that is tabulated over n+1 points, which we may define as $f_k = f(x_k)$, $k = 0 \ldots n$. A spline may be a polynomial constructed between each pair of tabulated points, with some degree of non-locality (i.e. the polynomial also depends on other points other than the pair of tabulated points) in order to ensure smoothness along the resulting curve. Over any particular interval $(x_k, x_{k+1})$, we may be able to construct a linear function using the following formula:

$$f = Af_k + Bf_{k+1} \tag{1}$$

where A is defined as $$\frac{x_{k+1} - x}{x_{k+1} - x_k}$$

and B is defined as $$\frac{x - x_k}{x_{k+1} - x_k}.$$

However, such a function will not be as smooth an approximation as may be desirable. In order to generate a smooth approximation that is continuous in both its first and second derivatives, an alternative nonlinear function may be desirable. For example, it may be possible to generate a quadratic spline, or a cubic spline.

A cubic spline can be generated for a series of data points $f_k = f(x_k)$, $k=0 \ldots n$ by adding the tabulated second derivatives of $f_k$, as in the following equation:

$$f = Af_k + Bf_{k+1} + Cf_k'' + Df_{k+1}'' \tag{2}$$

wherein A and B are defined as above, C is defined as $\frac{1}{6}(A^3 - A)(x_{k+1} - x_k)^2$, and D is defined as $\frac{1}{6}(B^3 - B)(x_{k+1} - x_k)^2$.

By adding in the continuity requirements, and making certain substitutions, the following n−1 linear equations can be generated for the set of n+1 unknowns specified above:

$$\frac{x_k - x_{k+1}}{6} f''_{k-1} + \frac{x_{k+1} - x_{k+1}}{3} f''_k + \frac{x_{k+1} - x_k}{6} f''_{k+1} = \qquad (3)$$

$$\frac{f_{k+1} - f_k}{x_{k+1} - x_k} - \frac{f_k - f_{k-1}}{x_k - x_{k-1}}$$

This yields a two-parameter family of possible solutions. For a unique solution, such as may be used to generate a spiral waveform, further conditions (generally boundary conditions) may be specified.

Once boundary conditions or other conditions are specified, a solution to this system of equations may be calculated, yielding a piecewise polynomial S(x) governing the behavior of a spline curve. This polynomial may take the form $$S(x) = \begin{cases} p_1(x) = a_1 + b_1 x + c_1 x^2 + d_1 x^3, \ x \in [x_0, x_1] \\ \vdots \\ p_n(x) = a_n + b_n x + c_n x^2 + d_n x^3, \ x \in [x_{n-1}, x_n] \end{cases} \qquad (4)$$

wherein, for a cubic polynomial $p_k$ defined over a particular interval $(x_{k-1}, x_k)$, $a_k$, $b_k$, $c_k$, and $d_k$ are constants defined for that cubic polynomial over that particular interval. The values of each of these constants may vary depending on factors like the conditions that are imposed to construct the spline polynomials; different conditions may yield different values for $a_k$, $b_k$, $c_k$, and $d_k$.

For example, multiple different types of cubic splines, such as "natural splines," "clamped splines," or "not-a-knot splines," may each require that different end conditions be specified for a given spline data set. For example, in a "natural spline," the second derivative of the spline curve may be defined as being zero at each end. In a "clamped spline," the first derivative of the spline curve may be specified at each of the ends (and may also be zero). A "clamped spline" wherein the first derivatives at either end are defined to be zero may be referred to as a "zero derivative" spline. Last, in a "not-a-knot" spline, the first and last end points may have a third derivative that is equal to the third derivative of the next outermost point (that is, the second and second-to-last points). This will effectively mean that the second and second-to-last points are not knots.

For example, according to an exemplary embodiment, a first exemplary technique may involve a first variation of splines, and may include a "Not-a-Knot" end condition, wherein the third derivative of the first point in a series of points may be the same as the second point in the series of points, and wherein the third derivative of the last point in the series of points may be the same as the second-to-last point in the series of points. A spiral-based symbol waveform whose intra-symbol amplitude variation is determined by the spline "Not-a-Knot" end condition may be constructed, for example, from the following exemplary MATLAB code as would be understood by a person of ordinary skill in the art.

Exemplary MATLAB code for Spline, "Not-a-Knot" end condition:

| | | |
|---|---|---|
| min_amp = | 1; | % Minimum complex amplitude |
| max_amp = | 2; | % Maximum complex amplitude |
| numpts = | 32; | % Number of points in symbol waveform |
| x = | [1 ceil(numpts/2) numpts]; | % Indices for start, mid, end amplitudes |
| y = | [min_amp max_amp min_amp]; | % Start, middle, end complex amplitudes |
| idx = | 1:numpts; | % Indices to interpolate into |
| amps = | spline(x, y, idx); | % Interpolate amplitudes using spline |
| angles = | (idx−1)*2*pi/(numpts−1); | % Angles for spiral |
| spiral = | amps .* exp(1j*angles); | % Spiral = amplitudes .* complex circle |

Figure 1:
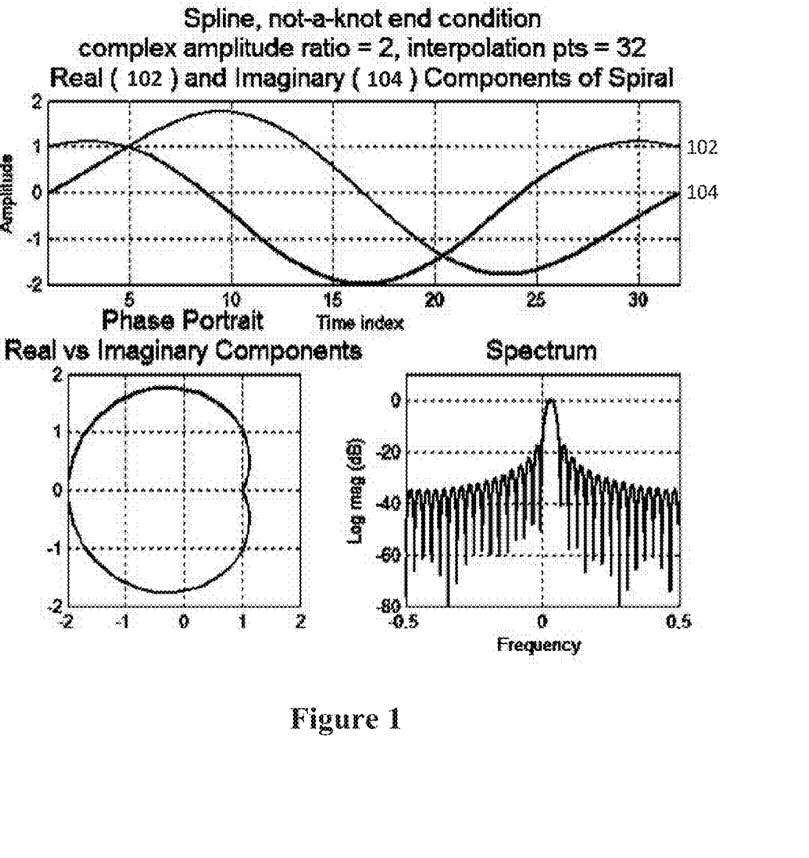
FIG. 1 may show an exemplary plot of a spiral-based waveform and its spectrum usage.

Exemplary FIG. 1 depicts a plot of the resulting spiral-based symbol waveform and its spectrum usage. A real 102 and an imaginary 104 component of the spiral may be depicted.

To provide an explanation of the above code, a minimum amplitude at which points will be defined (min_amp) and a maximum amplitude at which points will be defined (max_amp) may be provided. A number of points to be used to define the waveform in the MATLAB program (numpts) may then be defined.

The MATLAB program may use the following syntax to define a spline:

$$yy = \text{spline}(x, Y, xx) \qquad (5)$$

where x represents the X values of a series of points to be used to define the spline, and Y represents the equivalent Y values of the series of points to be used to define the spline. The spline program may then use a cubic spline interpretation to find yy, the values of this function at the values xx. In this case, the x values of the series of points to be used to define the spline are the starting point, a middle point, and the end point, which go from 1 to the "numpoints" value, used to define the length of the desired waveform. The Y values may be defined based on the minimum and maximum complex amplitude values specified earlier; for example, the first x point may have an amplitude of 1, the second x point may have an amplitude of 2, and the third may have an amplitude of 1. The values calculated by the cubic spline interpolation are saved as the variable "amps," and may be used as the amplitudes for a spiral waveform.

The angles to be used in generating the complex waveform may then be generated. According to the exemplary embodiment displayed above, this step may define a number of angles, in specific increments, that go from 0 at the start of the series to 2π at the end of the series (meaning that a full loop of the spiral is defined).

The spiral waveform may then be generated. As depicted, the effects of the not-a-knot condition on the spiral waveform, for example the slight rise in amplitude above the defined values immediately after the starting point and immediately before the ending point, may be shown in the plot of exemplary FIG. 1.

According to an exemplary embodiment, a second exemplary technique may involve a second variation of splines, and may include a "Zero Derivative" end condition, where the first derivative associated with each of the first and the last points is defined to be zero. A spiral-based symbol waveform whose intra-symbol amplitude variation is determined by the spline "Zero Derivative" end condition may be constructed, for example, from the following exemplary MATLAB code as would be understood by a person of ordinary skill in the art.

Exemplary MATLAB code for Spline, "Zero Derivative" end condition:

```
min_amp =    1;                              % Minimum complex amplitude
max_amp =    2;                              % Maximum complex amplitude
numpts =     32;                             % Number of points in symbol waveform
x =          [1 ceil(numpts/2) numpts];      % Indices for start, mid, end amplitudes
y =          [min_amp max_amp min_amp];      % Start, middle, end complex amplitudes
idx =        1:numpts;                       % Indices to interpolate into
cs =         spline(x, [0 y 0]);             % Form interpolation polynomial
amps =       ppval(cs, idx);                 % Interpolate amplitudes using spline
angles =     (idx-1)*2*pi/(numpts-1);        % Angles for spiral
spiral =     amps .* exp(1j*angles);         % Spiral = amplitudes .* complex circle
```

Figure 2:
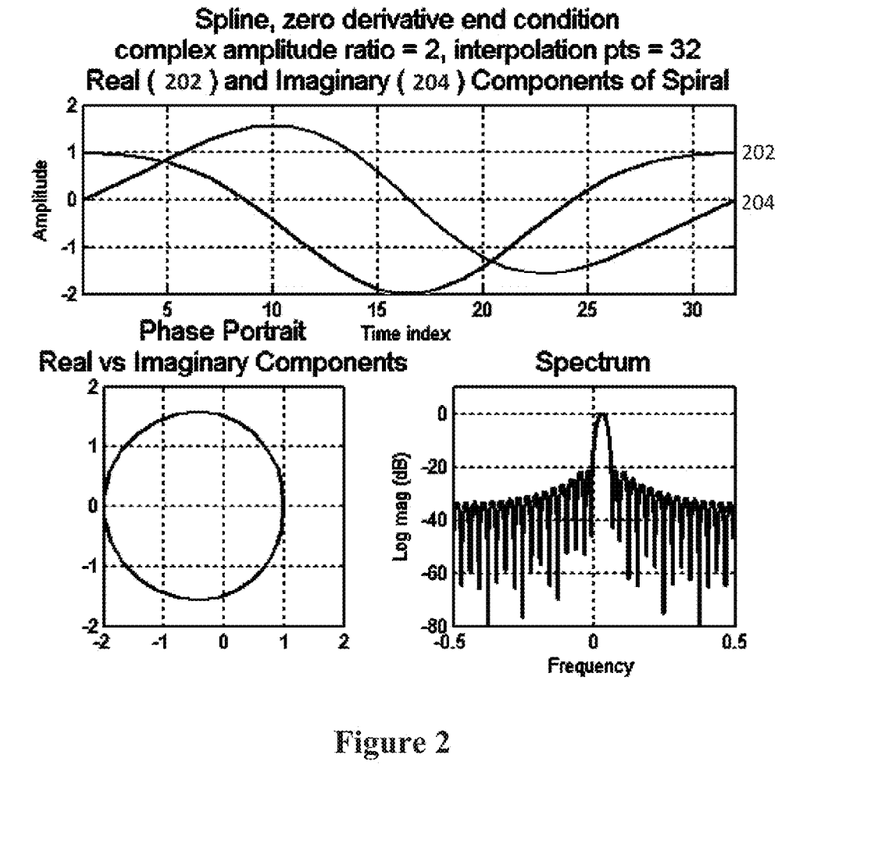
FIG. 2 may show another exemplary plot of a spiral-based waveform and its spectrum usage.

Exemplary FIG. 2 depicts a plot of the resulting spiral-based symbol waveform and its spectrum usage. A real 202 and an imaginary 204 component of the spiral may be depicted.

The spiral waveform defined by the second exemplary technique may be generated by code broadly similar to the code used in the first exemplary technique and used to generate the spline having a "not-a-knot" end condition. A notable distinction between the second set of code and the first set of code, however, may be the use of slightly different syntax in the "spline" function used to generate the data points used to define the spline. In this second exemplary embodiment, the MATLAB program may use the following syntax to define a spline:

$$cs = \text{spline}(x, Y) \quad (6)$$

wherein the cs value is the piecewise polynomial form of the cubic spline. In this case, the y value may be given as the vector [0 y 0]; according to the MATLAB syntax, this may cause the first and last value (both zero) to be specified as the endslopes/first derivatives for the cubic spline, establishing the "zero derivative" end condition. The code then may evaluate the piecewise polynomial, using the ppval function to do so, to generate a number of values that may be saved as the variable "amps," and which may be used as the amplitudes for a spiral waveform. The code may otherwise continue as it did in the first exemplary embodiment.

A third exemplary technique may involve the use of linear amplitude variation, or linear growth/decay (e.g. Archimedes Spiral). For example, according to an exemplary embodiment, a spiral-based symbol waveform whose intra-symbol amplitude variation is linear (known as an "Archimedes Spiral") may be governed, in polar coordinate form, by the equation $$r = a\theta \quad (7)$$

wherein a is a constant. In Cartesian coordinate form, this equation would become $$x^2 + y^2 = a^2[\arctan(y/x)]^2. \quad (8)$$

An Archimedes Spiral may also be constructed from the following exemplary MATLAB code, as would be understood by a person of ordinary skill in the art. In this implementation, the amplitude may be ramped up linearly for the first half of the cycle (which would correspond to one half of the symbol time), then down for the other half of the cycle. More sophisticated implementations based on the idea of an Archimedes Spiral may be possible and covered by the present invention which may avoid a sharp amplitude derivative discontinuity at the peak.

Exemplary MATLAB code for Linear Growth/Decay (Archimedes Spiral):

```
min_amp =    1;                                          % Minimum complex amplitude
max_amp =    2;                                          % Maximum complex amplitude
numpts =     32;                                         % Number of points in symbol waveform
idx =        1:numpts;                                   % Indices to interpolate into
up_slope =   (max_amp - min_amp)/floor((numpts/2) -1);
down_slope = -up slope;
up_vec =     min_amp + up_slope .* (idx(1:floor(numpts/2)))-1);
down_vec =   max_amp + down_slope .* (idx(1:floor(numpts/2)))-1);
amps =       horzcat(up_vec, down_vec);                  % Linear up then linear down amplitudes
angles =     (idx-1)*2*pi/(numpts-1);                    % Angles for spiral
spiral =     amps .* exp(1j*angles);                     % Spiral = amplitudes .* complex circle
```

Figure 3:
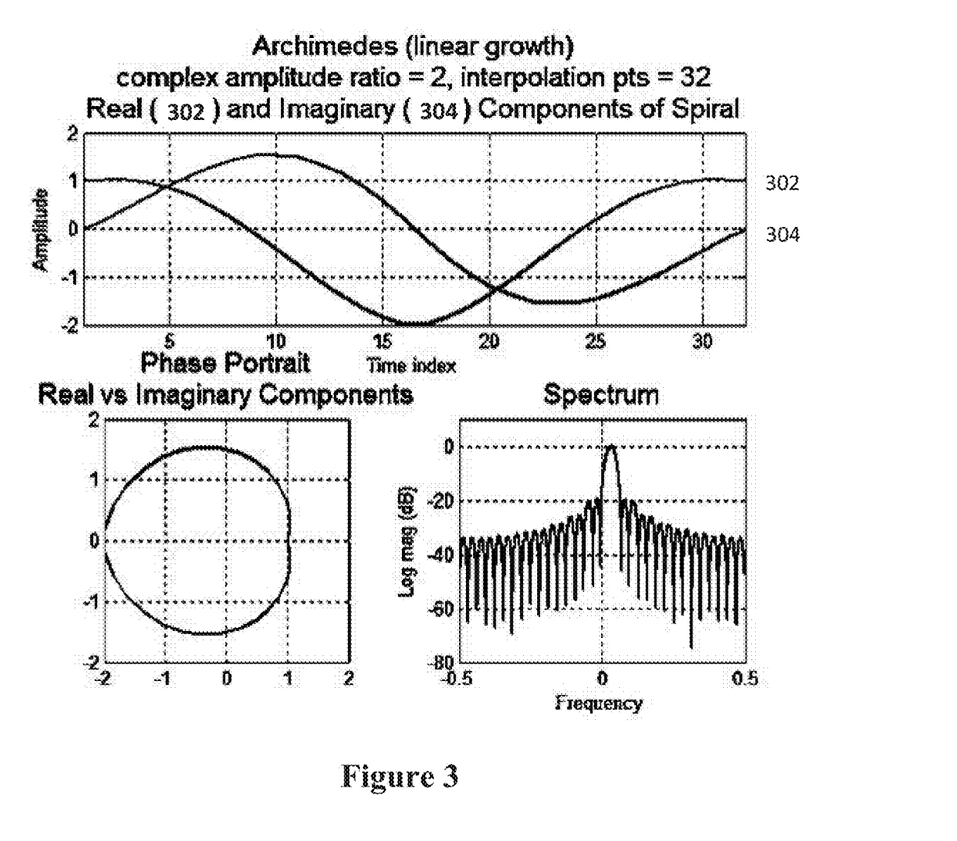
FIG. 3 may show a further exemplary embodiment of a spiral-based waveform and its spectrum usage.

Exemplary FIG. 3 depicts a plot of the resulting spiral-based symbol waveform and its spectrum usage. A real 302 and an imaginary 304 component of the spiral may be depicted.

To provide an explanation of the above code, a minimum amplitude at which points will be defined (min_amp) and a maximum amplitude at which points will be defined (max_amp) may be provided. A number of points to be used to define the waveform in the MATLAB program (numpts) may then be defined.

The program may then define the upward slope that the spiral-based waveform will have as it approaches the peak (up_slope) and the downward slope that the spiral-based waveform will have as it moves away from the peak (down_slope). In this case, as the code defines a spiral-based symbol waveform whose intra-symbol amplitude variation is linear, the upward slope and the downward slope may each be constant. Vectors of points of the spiral-based waveform as it approaches the peak (up_vec) and as it moves away from the peak (down_vec) may then each be calculated. These vectors may then be saved as the variable "amps," and may be used as the amplitudes for a spiral waveform.

The angles to be used in generating the complex waveform may then be generated. According to the exemplary embodiment displayed above, this step may define a number of angles, in specific increments, that go from 0 at the start of the series to $2\pi$ at the end of the series (meaning that a full loop of the spiral is defined).

This may yield the following equation for an Archimedes Spiral function in complex space:

$$f(t) = (a + bt)e^{\frac{2\pi j}{C}t} \qquad (9)$$

wherein a is a constant (a starting amplitude), b is a slope, C is a constant used to define the rate of angular progression of the spiral in complex space, and j is an imaginary square root of minus one. This equation may be used to generate an exemplary embodiment of a waveform used for communication. According to an exemplary embodiment, the waveform may grow and shrink in magnitude according to the Archimedes Spiral equation; for example, according to an exemplary embodiment, a waveform may have positive slope for half of the values of time t and a negative slope for the other half of the values of time t.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for communicating, comprising:
   obtaining at least one input communication symbol selected from a set of communication symbols;
   converting the at least one input communication symbol into at least one transmittable waveform using at least one non-periodic function selected from a set of non-periodic functions; and
   transmitting the at least one transmittable waveform over a communication channel,
   wherein the at least one non-periodic function selected from the set of non-periodic functions is a complex circle function multiplied by a piecewise function,
   wherein the piecewise function is generated from a system of equations comprising a plurality of boundary conditions and at least one spline function, the spline function having the form:

$$\frac{x_k - x_{k+1}}{6}f''_{k-1} + \frac{x_{k+1} - x_{k-1}}{3}f''_k + \frac{x_{k+1} - x_k}{6}f''_{k+1} = \frac{f_{k+1} - f_k}{x_{k+1} - x_k} - \frac{f_k - f_{k-1}}{x_k - x_{k-1}}$$

wherein k is an integer in a set of integers having a first point $k_0$ and a last point $k_n$, n is a positive integer, $x_k$ is a tabulated data value of x at a particular value of k, $f_k$ is a tabulated value of a function $f$ at a particular value of k, and $f_k''$ is a tabulated value of the second derivative of a function $f$ at a particular value of k;
wherein the plurality of boundary conditions comprises a "not-a-knot" condition set, wherein the third derivative of $f_k$ when $k=k_1$ is continuous and the third derivative of $f_k$ when $k=k_{n-1}$ is continuous.

2. The method of claim 1, wherein the piecewise function comprises a plurality of cubic piecewise polynomials and has the form:

$$S(x) = \begin{cases} p_1(x) = a_1 + b_1 x + c_1 x^2 + d_1 x^3, x \in [x_0, x_1] \\ \vdots \\ p_n(x) = a_n + b_n x + c_n x^2 + d_n x^3, x \in [x_{n-1}, x_n] \end{cases}$$

wherein, for a cubic polynomial p defined over a particular interval, a, b, c, and d are constants defined for that cubic polynomial over the particular interval, and n is an integer equal to or greater than 2.

3. A method for communicating, comprising:
   obtaining at least one input communication symbol selected from a set of communication symbols;
   converting the at least one input communication symbol into at least one transmittable waveform using at least one non-periodic function selected from a set of non-periodic functions; and
   transmitting the at least one transmittable waveform over a communication channel,
   wherein at least one non-periodic function selected from the set of non-periodic functions is a complex circle function multiplied by a piecewise function,
   wherein the piecewise function is generated from a system of equations comprising a plurality of boundary conditions and at least one spline function, the spline function having the form:

$$\frac{x_k - x_{k+1}}{6}f''_{k-1} + \frac{x_{k+1} - x_{k-1}}{3}f''_k + \frac{x_{k+1} - x_k}{6}f''_{k+1} = \frac{f_{k+1} - f_k}{x_{k+1} - x_k} - \frac{f_k - f_{k-1}}{x_k - x_{k-1}}$$

wherein k is an integer in a set of integers having a first point $k_0$ and a last point $k_n$, n is a positive integer, $x_k$ is a tabulated data value of x at a particular value of k, $f_k$ is a tabulated value of a function $f$ at a particular value of k, and $f_k''$ is a tabulated value of the second derivative of a function $f$ at a particular value of k;
wherein the plurality of boundary conditions comprises a clamped spline end condition set, wherein the first derivative of $f_k$ when $k=k_0$ is specified and the first derivative of $f_k$ when $k=k_n$ is specified.

4. The method of claim 3, wherein the piecewise function comprises a plurality of cubic piecewise polynomials and has the form:

$$S(x) = \begin{cases} p_1(x) = a_1 + b_1 x + c_1 x^2 + d_1 x^3, x \in [x_0, x_1] \\ \vdots \\ p_n(x) = a_n + b_n x + c_n x^2 + d_n x^3, x \in [x_{n-1}, x_n] \end{cases}$$

wherein, for a cubic polynomial p defined over a particular interval, a, b, c, and d are constants defined for that cubic polynomial over the particular interval, and n is an integer equal to or greater than 2.

5. A method for communicating, comprising:
obtaining at least one input communication symbol selected from a set of communication symbols;
converting the at least one input communication symbol into at least one transmittable waveform using at least one non-periodic function selected from a set of non-periodic functions; and
transmitting the at least one transmittable waveform over a communication channel,
wherein at least one non-periodic function selected from the set of non-periodic functions is a complex circle function multiplied by a piecewise function,
wherein the piecewise function is generated from a system of equations comprising a plurality of boundary conditions and at least one spline function, the spline function having the form:

$$\frac{x_k - x_{k+1}}{6} f''_{k-1} + \frac{x_{k+1} - x_{k+1}}{3} f''_k + \frac{x_{k+1} - x_k}{6} f''_{k+1} = \frac{f_{k+1} - f_k}{x_{k+1} - x_k} - \frac{f_k - f_{k-1}}{x_k - x_{k-1}}$$

wherein k is an integer in a set of integers having a first point $k_0$ and a last point $k_n$, n is a positive integer, $x_k$ is a tabulated data value of x at a particular value of k, $f_k$ is a tabulated value of a function $f$ at a particular value of k, and $f_k''$ is a tabulated value of the second derivative of a function $f$ at a particular value of k;
wherein the first derivative of $f_k$ when $k = k_0$ is specified to be zero and the first derivative of $f_k$ when $k=k_n$ is specified to be zero.

6. The method of claim 5, wherein the piecewise function comprises a plurality of cubic piecewise polynomials and has the form:

$$S(x) = \begin{cases} p_1(x) = a_1 + b_1 x + c_1 x^2 + d_1 x^3, x \in [x_0, x_1] \\ \vdots \\ p_n(x) = a_n + b_n x + c_n x^2 + d_n x^3, x \in [x_{n-1}, x_n] \end{cases}$$

wherein, for a cubic polynomial p defined over a particular interval, a, b, c, and d are constants defined for that cubic polynomial over the particular interval, and n is an integer equal to or greater than 2.

7. A method for communicating, comprising:
obtaining at least one input communication symbol selected from a set of communication symbols;
converting the at least one input communication symbol into at least one transmittable waveform using at least one non-periodic function selected from a set of non-periodic functions; and
transmitting the at least one transmittable waveform over a communication channel, wherein at least one non-periodic function selected from the set of non-periodic functions comprises a cyclical function formed from a pair of piecewise Archimedes Spiral functions each having the form:

$$f(t) = (a_0 + bt)e^{\frac{2\pi j}{C}t}$$

wherein $a_0$ is a constant defining a starting amplitude, b is a slope, C is a constant defining the rate of angular progression of the spiral in complex space, and j is an imaginary square root of minus one.

8. The method for communicating of claim 7, wherein the step of converting the at least one input communication symbol into at least one transmittable waveform comprises using at least one head function and at least one tail function, wherein the head function is the Archimedes Spiral function, and wherein the tail function is an Archimedes Spiral function having the form:

$$f(t) = (a_1 - bt)e^{\frac{2\pi j}{C}t}$$

wherein $a_1$ is a constant defining a starting amplitude other than $a_0$.

* * * * *